June 14, 1938.  P. J. McCULLOUGH  2,120,289
ELECTRICAL APPARATUS
Filed Aug. 31, 1936  2 Sheets-Sheet 2
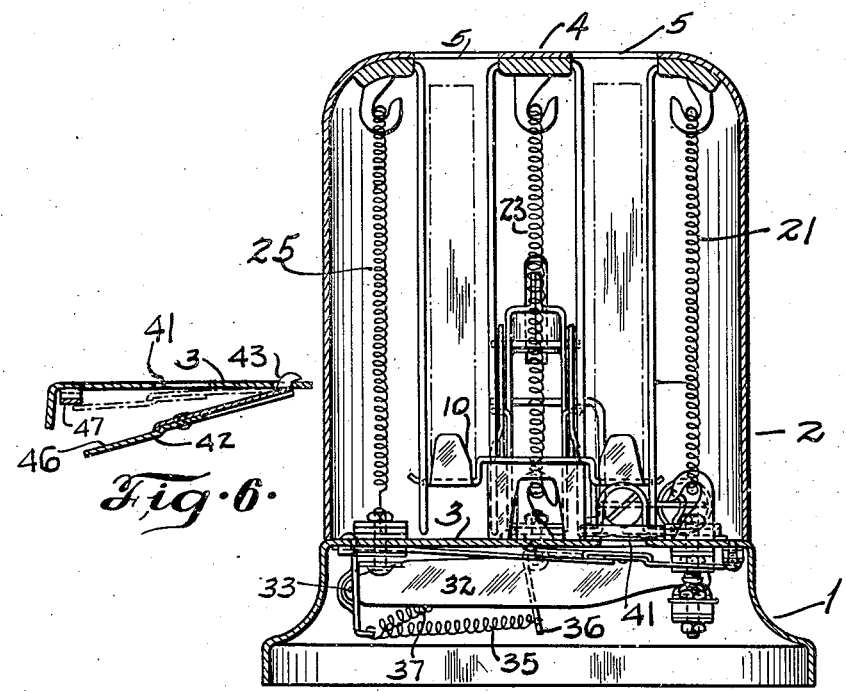
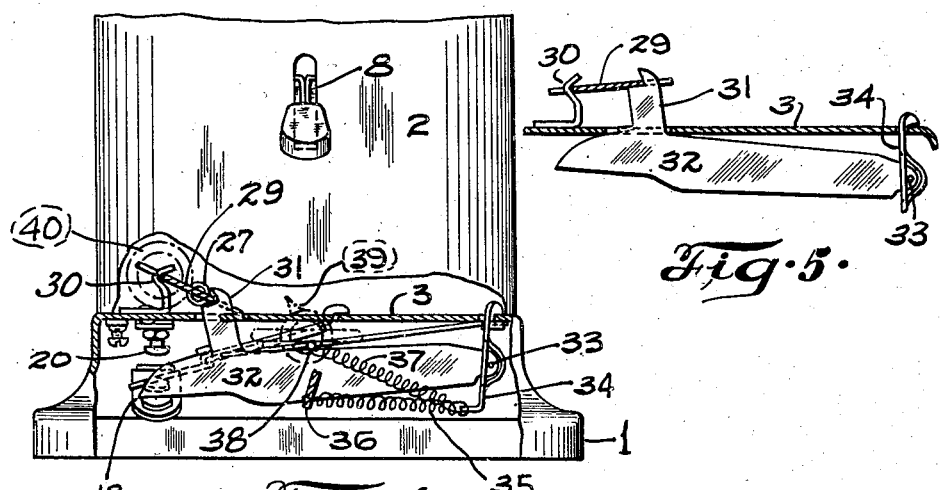
Inventor
Paul J. McCullough
By Rodney Bedell
Attorney Patented June 14, 1938

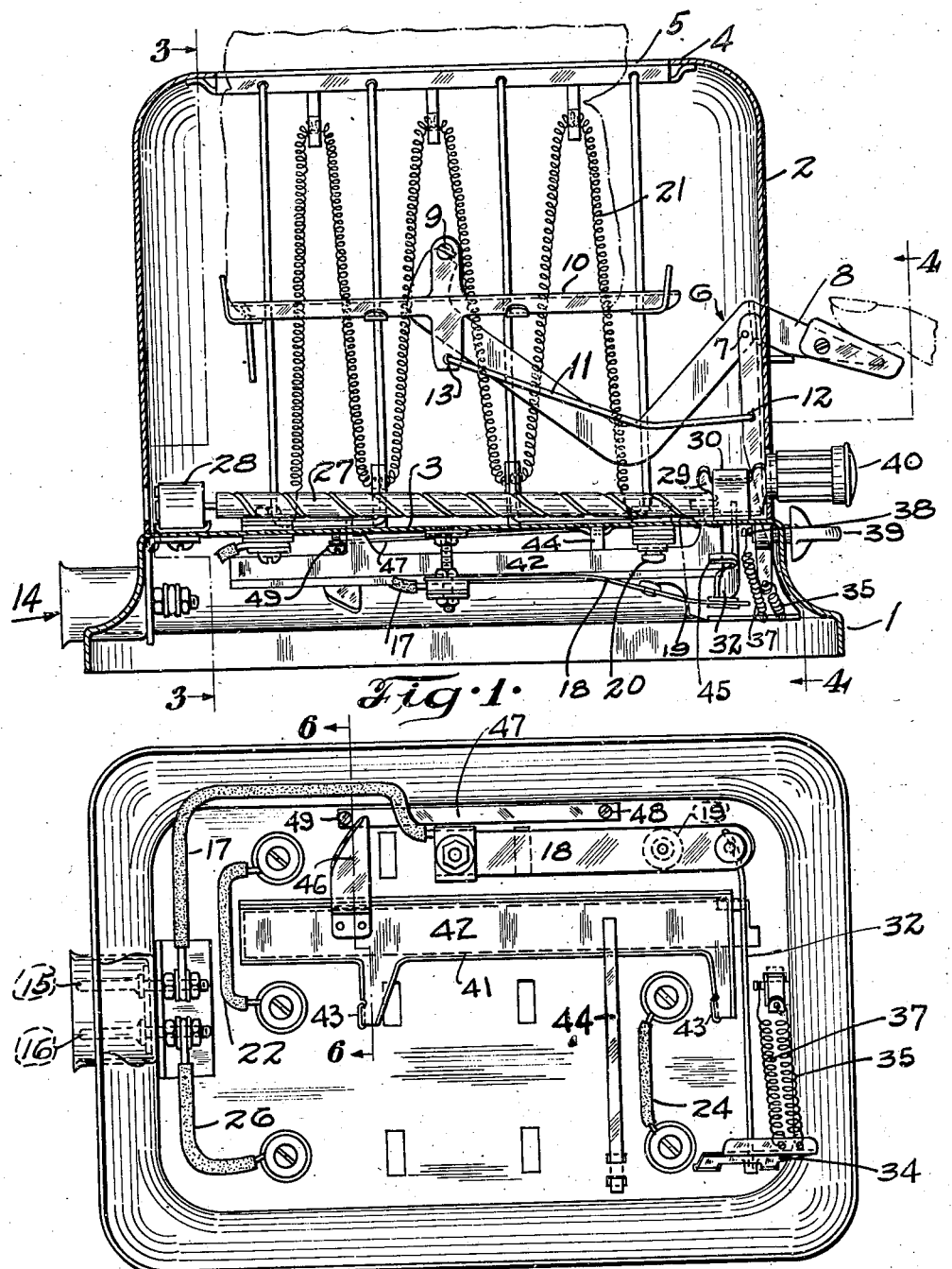

2,120,289

UNITED STATES PATENT OFFICE 2,120,289

ELECTRICAL APPARATUS

Paul J. McCullough, St. Louis, Mo., assignor to Joseph Pavelka, Sr., St. Louis, Mo.

Application August 31, 1936, Serial No. 98,699

16 Claims. (Cl. 219—19)

The invention relates generally to thermostatically controlled apparatus and more particularly to apparatus designed for frequent, successive, independent operations, and consists in all of the novel features described below and disclosed in the accompanying drawings which illustrate as a selected embodiment of the invention a domestic electric toaster of the enclosed housing type which automatically opens the electric circuit when a thermostatic element in the toaster is heated to a predetermined degree.

When operations are started with such a toaster, all of its parts are at room temperature which may be very cold, at least relative to toasting temperature. It will take longer to toast the first slices of bread placed in the toaster than it would take to toast successive slices of bread placed in the toaster after its parts are well heated.

It will take longer for a thermostatic element which is cold (as would be the case at the beginning of operations) to heat to a switch operating temperature than it would take for a thermostatic element which is partially warmed (as it would be after an initial operation) to again heat up to the switch operating temperature.

Variations in the non-operating time between successive operations (so long as the thermostatic element and other parts of the heater did not lose all of their heat between operations) would result in corresponding different periods of operation after the toaster switch is closed and before the thermostat automatically opens the switch.

Obviously the above-mentioned conditions would result in non-uniform operations of the toaster; in other words, the first slices of bread placed in the toaster might be underdone and, upon the user resetting the toaster to toast longer, successive slices might well be overdone. Then if the toaster is reset to remedy this situation and there is a delay before the next toasting, the latter again might be underdone.

The main object of the present invention is to regulate the temperature to which a thermostatic device is subjected so that the periods of its operation may be more nearly uniform irrespective of the above-mentioned conditions tending to vary each operation according to the time elapsed since the previous operation and similar factors. Briefly, this desired object is attained by subjecting the thermostatic element to a stream of air from outside the apparatus between operations, thereby bringing the thermostatic element back nearly to room temperature at the beginning of each operation, which would provide a substantially uniform period of operation. Preferably the air stream is regulated in accordance with the temperature of the apparatus parts, other than the thermostatic element, so as to compensate for variations in the temperature of these parts at the beginning of each operation.

An additional object of the invention as applied to a domestic toaster is to facilitate the removal of toast from the device.

These and other detail objects of the invention will be better understood after reference to the detail description below and the associated drawings, in which—

Figure 1 is a vertical longitudinal section through a toaster of the enclosed housing type and embodying the present invention.

Figure 2 is a bottom view of the same.

Figure 3 is a transverse section taken substantially on the line 3—3 of Figure 1.

Figure 4 is partially an end view and partially a vertical transverse section taken approximately on the line 4—4 of Figure 1.

Figure 5 is a fragmentary view illustrating the same parts in a different position.

Figure 6 is a detail cross section taken on the line 6—6 of Figure 2.

Figure 7 illustrates a detail of a modified structure.

The toaster body includes a base 1 and an upper housing 2, there being a transverse horizontal bottom wall 3 between the base and upper portion which includes a top wall 4 having openings 5 for receiving slices of bread to be toasted.

A lever 6 is pivoted at 7 near one side wall 2 of the housing. The lever is provided with a portion 8 projecting outwardly of the housing and terminating in a handle for manual manipulation. The lever also includes a portion projecting inwardly from the housing wall and terminating in a pivot support 9 for a basket or carrier member 10 adapted to receive the lower edges of slices of bread inserted through the openings 5. A rod 11 is pivoted to the housing at 12 and to the carrier at 13 at points directly below the lever fulcrum 6 and support 9.

Depression of lever outer portion 8 elevates the carrier and its contents, as indicated in Figure 1, rod 11 serving to maintain the carrier horizontal as the lever and rod actuate like a parallel ruler to prevent tilting of the carrier.

The toaster is arranged for connection to the house wiring circuit by the usual plug (not shown) which is inserted at 14, engaging the terminals 15 and 16. The circuit leads from terminal 15 through conduit 17, a switch blade 18 having a contact button 19, opposing switch button 20, the heating element 21, conduit 22, heating element 23, conduit 24, heating element 25, and conduit 26, to the other terminal 16.

A thermostatic element 27 comprising a bimetallic helix is adjustably anchored at one end by the clamp 28 and at its opposite end engages a plate 29 which is seated at one end in an angular pivot bearing 30 and has a pivot bearing at its opposite end against an upright arm 31 forming an extension of a switch lever 32 pivoted at 33 to a swinging plate 34 depending from bottom wall 3. A spring 35 is tensioned between the lower end of plate 34 and a lug 36 on the base 1. A second spring 37 is tensioned between the lower end of plate 34 and an eccentrically mounted element 38 which may be moved to different positions by rotation of the indicator 39 on the exterior of the housing.

When the parts are in the position shown in Figure 4, the tendency of springs 35 and 37 is to move lever 32 with its arm 31 to the left, thrusting plate 29 downwardly with its lower end against bottom wall 3.

A knob 40 secured to the upper end of plate 29 projects outwardly from the housing and the plate may be rotated in a counterclockwise direction thereby to shift its pivotal point so that the thrust of arm 31 is upwardly, the upward movement of plate 29 being limited by the engagement between lever 32 and wall 3 (see Figure 5).

The left hand end of lever 32 (Figures 4 and 1) engages the adjacent end of switch blade 18 to hold it in circuit opening position. When lever 32 is in the position shown in Figure 5, the inherent spring qualities of blade 18 will move it to circuit closing position.

The parts numbered from 29 to 38, inclusive, constitute a quick action shift or snap over arrangement whereby the action of the thermostat to open the switch or the action of the operator to close the switch will be rapid, thus avoiding arcing between the switch buttons or fluttering of the parts.

Bottom wall 3 is provided with an opening 41 substantially throughout its length and immediately below thermostatic element 27. A door plate 42 is hinged to wall 3 at 43 and may move to exclude or permit the passage of air through the opening, a flat spring 44 yieldingly holding the door closed. A finger 45 near the lefthand end of lever 32 is positioned to engage the top of door 42 and hold it down against the thrust of spring 44 when the parts are in the position shown in Figure 4.

A tongue 46 (Figures 2 and 6) on door 42 is arranged to engage the free end of a thermostatic element 47 anchored at 48 if the thermostatic element 47 be heated sufficiently to bend it downwardly to the position indicated in Figure 1. A screw 49 is threaded into bottom wall 3 and adjustably limits the downward movement of thermostatic element 47. Hence the element 47 constitutes a stop for door 42, counteracting the tendency of flat spring 44 to fully close the door.

*Operation.*—Assume the parts to be cold and slices of bread placed in the toaster as indicated in Figure 3. The operator rotates knob 40 in a counterclockwise direction, moving other parts into the position shown in Figure 5, whereupon spring 44 will raise door 42, completely closing the opening 41 as thermostatic element 47, being cold, will lie flat against the bottom of wall 3 and will not interfere with the upward movement of finger 46. Switch buttons 19 and 20 are now in contact and the heating elements 21, 23, 25 begin to function.

As thermostatic element 27 is heated, it tends to rotate in a clockwise direction, which tendency increases until it overcomes the tension of springs 35 and 37, when plate 29 will be shifted to the position shown in Figure 4 which throws lever 32 downwardly, engaging switch blade 18 and opening the circuit and also engaging the door 42 to uncover opening 41. Obviously thermostatic element 27 will be set so that the amount of heat required to actuate it as described will have been produced only after the bread has been toasted. The amount of such heat may be varied by the manual adjustment of indicator 39, which will vary the tension of spring 37, making it easier or more difficult for thermostat 27 to function.

The flow of air through opening 41 tends to cool thermostatic element 27 more rapidly than it would be cooled if the housing remained closed and the element could radiate its heat only into the surrounding relatively still and heated air of the housing which would be subjected to the retained heat in the elements 21, 23 and 25 and all of the other parts of the heater.

Even though the toasted slices are removed and fresh slices of bread inserted in the heater and the switch again closed, all without substantial delay, the thermostat will have to be heated from a much lower temperature than it would have if it had not been subject to the air stream for a short period.

If a new operation is started before the parts have cooled substantially, thermostatic element 47 being heated from bottom wall 3 will assume a position as indicated in Figure 1, preventing the complete closing of opening 41 by door 42 and permitting a restricted stream of air to pass through the opening and over thermostatic element 47, thus counteracting a rapid reheating of the element to switch opening temperature. As previously indicated, this function of element 47 is controlled by the adjustment of screw 49. The adjustment just mentioned and the adjustable anchorage 28 of thermostat 27 ordinarily are not manipulated by the user but are set at the factory and, possibly, by a repair man after the original efficiency of the device has been impaired by long use. The indicator 40 is the only adjustment required to be made by the user and this is only required because of the difference in preferences as to light, dark, or medium toasting.

While the invention has been described in detail as applied to a toaster, it will be understood that the principle of providing a thermostatic actuated air valve to facilitate the dissipation of heat from the thermostatic element after a particular operation is completed in order that a successive operation may produce similar results, is applicable to many other devices and uses as will be suggested to those familiar with this art.

The limitation of the closing movement of door 42 by the auxiliary thermostat 37 is but one way of providing an increased flow of air over the main thermostat as the heat in the parts of the device is increased.

Figure 7 illustrates a modified structure in which a bottom wall 50, corresponding to bottom wall 3, is provided with an aperture 51 in addition to the main aperture corresponding to that shown at 41 in Figures 1 to 5, and a flat bimetallic member 52 anchored at 53 moves to and from wall 50 to close or open the opening accordingly as the temperature to which member 52 is subjected decreases or increases.

This and other variations in the details of the structure may be made without departing from the spirit of the invention and I contemplate the exclusive use of such modifications of the relatively unimportant details of the invention as come within the scope of the appended claims.

I claim:

1. In an apparatus constructed for intermittent operations of heating successive articles from a cool temperature, each operation to be substantially uniform in extent and each to terminate automatically, a thermostat for effecting the termination of each heating operation, and automatic means controlled by said thermostat for passing an air stream from the exterior of the apparatus over said thermostat when it has terminated a heating operation and thereby promptly reduce the temperature of the thermostat so that its successive heating periods will be more nearly uniform.

2. In combination, an air valve, an energy-consuming heater, a thermostat in the path of air passing through said valve, and a connection between said thermostat and said valve and controlling the supply of energy to said heater for opening said valve for the passing of air therethrough when said thermostat is heated to a predetermined degree.

3. In combination, an air valve, a heater, a heater-controlling thermostat in the path of air passing through said valve, means tending to move said valve to a closed position, and another thermostat removed from said path for limiting the closing movement of said valve according to the temperature to which said latter mentioned thermostat is subjected.

4. In combination in a toaster, a housing, a heater therein, a thermostatic element operatively connected to said heater to shut off the supply of energy to said heater when said element is heated to a predetermined degree, said element normally being free of currents of air from outside of said housing, and means providing a flow of air through the wall of said housing directly to and over said element when said element is heated to said degree.

5. In combination in a toaster, a housing, an electric heating element therein, a switch for controlling current to said element, a thermostatic element operatively connected to said switch to open the same when said thermostatic element is heated to a predetermined degree, and means initiating a flow of air through the wall of said housing over said thermostatic element when said thermostatic element is heated to said degree.

6. In combination in a toaster, a housing including a wall having an opening, a door for said opening, a heater in said housing, and control means for said heater including a thermostatic element in said housing and directly in the path of air entering through said opening and operatively connected to said door to open said door and be quickly cooled by air entering therethrough when said thermostatic element is heated to a predetermined degree.

7. An apparatus as described in claim 6 which also includes means for closing the door, and another thermostatic element limiting the closing movement of said door by said means according to the degree of heat to which said latter mentioned thermostatic element is subjected.

8. In combination, a housing including a wall having an opening, a door for said opening, a heater in said housing, a thermostatic element in said housing adjacent to said opening and operatively connected to said door and heater to open said door and shut off the supply of energy to said heater when said thermostatic element is heated to a predetermined degree.

9. In combination, a housing including a wall having an opening, an electric heating element in said housing, a switch for controlling current to said element, a door for closing said opening, a manually operated member for closing said switch, a spring for closing said door when said member is actuated as described, and a thermostatic element adjacent to said opening and operatively connected to said member to shift same to its original position and to open said switch and door when said thermostatic element is heated to a predetermined degree.

10. In combination, a housing including a wall having a narrow elongated opening extending substantially from side to side of said housing, a narrow elongated thermostatic element with one end secured to said housing near one end of said spring and overlying said opening, a heater in said housing above said thermostatic element, control means for said heater including said thermostatic element, a door for closing said opening, and an operative connection between the other end of said thermostatic element and said door for opening the latter when said element is heated to a predetermined degree.

11. An apparatus as described in claim 10 which which also includes a device controlling the functioning of said heater, and an operative connection between said thermostatic element and said device for terminating the functioning of the latter when said thermostatic element is heated to open said door.

12. In combination, a housing including a wall having a narrow elongated opening extending substantially from side to side of said housing, a narrow elongated thermostatic element in said housing overlying said opening and comprising a bi-metallic helix anchored at one end near a wall of said opening, a heater in said housing, a device for terminating the functioning of said heater, an operative connection between the other end of said helix and said device for actuating the latter when said thermostatic element is heated to a predetermined degree, a door for closing said opening, and an operative connection between said latter-mentioned end of said helix and said door for opening the latter when said element is heated as described.

13. In combination, a housing including a wall having an opening, a door for said opening, means for closing said door, a heating device, a thermostat in said housing and subject to the flow of air through said opening, means controlled by said thermostat to terminate the functioning of said heating device and to move said door away from said opening when said thermostat is heated to a predetermined temperature, and another thermostatic device removed from the path of air passing through said opening and operative when heated to limit the closing movement of said door.

14. In combination, a housing, a plurality of valves for admitting air to said housing, a heater in said housing, a heater-controlling thermostat in said housing in the path of air passing through one of said valves, and another thermostat which regulates another of said air valves according to the temperature to which said latter-mentioned thermostat is subjected.

15. In combination, a housing, a plurality of valves for admitting air to said housing, a heater in said housing, a heater-controlling thermostat in said housing in the path of air passing through one of said valves, means tending to move one of said valves to a closed position, and another thermostat removed from said path of air and regulating another of said air valves according to the temperature to which said latter-mentioned thermostat is subjected.

16. In combination in a toaster, a housing including a wall having an opening, a door for said opening, a heater in said housing, an electric circuit for energizing said heater, a device for closing said circuit, and a thermostatic element in said housing and directly in the path of air entering through said opening and operatively connected to said circuit and to said door, and functioning independently of said device, when heated to a predetermined degree, to open said circuit and door.

PAUL J. McCULLOUGH.